United States Patent [19]

Wolsink et al.

[11] Patent Number: 5,091,470
[45] Date of Patent: Feb. 25, 1992

[54] MOLDING RESIN

[75] Inventors: Hendrick W. Wolsink, Terneuzen, Netherlands; John J. Plomer; Thomas D. Traugott, both of Midland, Mich.

[73] Assignee: The Dow Chemical Company, Midland, Mich.

[21] Appl. No.: 581,436

[22] Filed: Sep. 10, 1990

Related U.S. Application Data

[60] Continuation of Ser. No. 343,301, Apr. 26, 1989, abandoned, which is a division of Ser. No. 172,621, Mar. 24, 1988, abandoned.

[51] Int. Cl.$^5$ .................. C08L 51/04; C08L 55/02; C08L 33/24
[52] U.S. Cl. .................. 525/71; 525/73; 525/282
[58] Field of Search .................. 525/71, 73, 282

[56] References Cited

U.S. PATENT DOCUMENTS

| | | | |
|---|---|---|---|
| 3,652,726 | 9/1972 | Nield et al. | 525/73 |
| 3,766,142 | 10/1973 | Nield et al. | 525/73 |
| 4,145,378 | 3/1979 | Arrighetti et al. | 525/282 |
| 4,205,020 | 5/1980 | Hendy et al. | 525/282 |
| 4,374,951 | 2/1983 | Lee | 525/73 |
| 4,567,233 | 1/1986 | Tomono | 525/73 |
| 4,792,585 | 12/1988 | Yamamoto | 525/71 |
| 4,808,661 | 2/1989 | Iwamoto | 525/73 |
| 4,877,833 | 10/1989 | Kondo | 525/71 |
| 4,879,343 | 11/1989 | Aoki | 525/71 |

FOREIGN PATENT DOCUMENTS

| | | |
|---|---|---|
| 0216524 | 4/1987 | European Pat. Off. ......... 525/282 |
| 167341 | 10/1982 | Japan . |
| 184243 | 10/1984 | Japan . |
| 048712 | 3/1987 | Japan . |
| 101612 | 5/1987 | Japan . |
| 04309 | 6/1988 | World Int. Prop. O. . |

Primary Examiner—Melvyn I. Marquis
Assistant Examiner—David Buttner
Attorney, Agent, or Firm—Douglas N. Deline; James B. Guffey

[57] ABSTRACT

Thermoplastic rubber modified molding compositions containing N-phenyl maleimide, acrylonitrile, and at least one copolymerizable comonomer suitable for preparing moldings having low surface gloss.

16 Claims, No Drawings

MOLDING RESIN

This is a continuation of application Ser. No. 343,301 which was filed on Apr. 26, 1989, and now abandoned which was in turn a divisional of Ser. No. 172,621 which was filed on Mar. 24, 1988, and which is now abandoned.

BACKGROUND OF THE INVENTION

The present invention relates to an impact and heat resistant molding resin suitable for preparing molded objects having an excellent surface finish. More particularly, the present invention relates to a new injection molding resin suitable for the use in the preparation of automotive interior trim parts, appliance components and other objects requiring either a high or a low surface gloss and high heat resistance. Desirably, objects prepared from such resin may be employed in numerous end uses without painting.

Thermoplastic molding resins are finding increased use in the preparation of moldings for use in interior automotive trim applications and in other uses such as upholstery and appliances. Most desirably, such parts are produced by injection molding or other techniques and have suitable surface finish and appearance that further finishing operations, particularly painting in order to cover surface imperfections or to provide a low gloss finish, are unnecessary. High heat and impact resistant styrenic molding resins are already known in the art. Typical resins include rubber modified copolymers of styrene and alpha-methylstyrene or maleic anhydride, with or without additional copolymerizable comonomers, especially acrylonitrile. However, presently available styrenic molding resins of the high heat variety are difficult to mold since relatively high polymer melt temperatures and mold temperatures must be employed in their use and the polymers are thermally unstable. If the molder employs reduced temperatures during the molding process poor polymer mixing results giving surface defects such as flow lines and knit lines. Polymer degradation can result if higher temperatures are used giving surface splay and pitting. In addition the use of higher resin and mold temperatures generally results in the preparation of a high surface gloss. Suitable high heat and impact resistant styrene polymer molding resins capable of preparing injection molded parts having any desired surface appearance are unknown.

In U.S. Pat. No. 3,652,726 there are disclosed certain graft copolymers comprising a diene rubber substrate and a superstrate resin comprising acrylonitrile, N-aryl maleimide and an aromatic olefin, such as styrene. Also disclosed are blends of such graft copolymer with various compatible matrix resins. The reference further teaches at col. 6, line 70, that the graft copolymers may be made by a sequential polymerization in which the monomers for the superstrate are polymerized by a free radical process. Bulk, suspension, solution, or emulsion polymerizations are all disclosed as suitable for preparing such polymers. Emulsion techniques are particularly exemplified.

Significantly, following the teachings of U.S. Pat. No. 3,652,726, and in particularly utilizing emulsion polymerization techniques, the resulting resin has been found to possess the high heat and good impact properties described for such resins. However, such resins provide only high surface gloss molded objects. It has now been discovered that utilizing a mass or solution polymerization process especially a continuous process it is possible to achieve greater control and uniformity in the sizing of the graft and particulated rubber structure. As a consequence, there is now provided an improved impact and heat resistant molding polymer comprising a rubbery substrate polymer and a superstrate comprising, in polymerized form, one or more monovinylidene aromatic polymers, acrylonitrile, and one or more N-aryl maleimide and resulting in molded objects having a wide range of gloss properties including most significantly low gloss and the substantial absence of splaying and other surface defects.

SUMMARY OF THE INVENTION

According to the present invention, there is now provided a thermoplastic molding composition comprising:
1) a graft copolymer comprising in polymerized form an ethylenically unsaturated nitrile monomer, an N-aryl maleimide and at least one copolymerizable monomer selected from the group consisting of monovinylidene aromatic monomers, $C_{1-4}$ alkyl methacrylates, and mixtures thereof grafted to a rubbery substrate polymer; and
2) a matrix polymer comprising in polymerized form an ethylenically unsaturated nitrile monomer, an N-aryl maleimide and at least one copolymerizable monomer selected from the group consisting of monovinylidene aromatic monomers, $C_{1-4}$ alkyl methacrylate, and mixtures thereof, said thermoplastic molding composition having been prepared by a mass or solution polymerization of the monomers comprising the graft copolymer in the presence of the dissolved rubbery polymer.

In a further embodiment of the present invention there is provided a process for preparing a thermoplastic molding composition suitable for preparing injection molded objects having improved surface aesthetic properties particularly low surface gloss comprising:
1) dissolving a rubbery polymer in a mixture of monomers comprising an ethylenically unsaturated nitrile, a copolymerizable monovinylidene monomer and an N-aryl maleimide;
2) initiating free radical polymerization of the rubber containing solution and continuing the polymerization thereof under mass or solution polymerization conditions so as to obtain a phase inversion of the solution:
3) continuing polymerization of the rubber containing solution; and
4) recovering the resulting polymeric product.

Surprisingly it has been discovered that thermoplastic molding compositions corresponding to the present invention and prepared according to the above described process possess an improved appearance compared to emulsion polymerized N-aryl maleimide containing impact polymers such that molded objects prepared therefrom need not be painted or otherwise processed to prepare low surface gloss molded items for use in automotive interior trim applications.

DETAILED DESCRIPTION OF THE INVENTION

Ethylenically unsaturated nitrile monomers employed in the present invention include acrylonitrile, and lower alkyl substituted derivatives thereof such as methacrylonitrile, ethacrylonitrile, etc. A preferred ethylenically unsaturated nitrile monomer is acrylonitrile.

N-aryl maleimide monomers suitably employed in the present invention include those compositions wherein the aryl substituent is derived from an aromatic hydrocarbon in which one or more of the atoms may be replaced by other inert atoms such as halo or groups such as lower alkyl. Suitable N-aryl maleimides are disclosed in U.S. Pat. No. 3,652,726 the teachings of which are incorporated herein in their entirety by reference thereto. A preferred N-aryl maleimide monomer is N-phenyl maleimide.

Examples of suitable monovinylidene aromatic monomers employed as the copolymerizable monomer in the present invention include styrene, α-methylstyrene, p-vinyl toluene, etc. A preferred monovinylidene aromatic monomer is styrene. Examples of suitable $C_{1-4}$ alkyl methacrylates include methyl methacrylate, n-butyl methacrylate, etc.

Suitable rubbery polymers employed as the graft substrate in the present invention include diene, olefin and acrylate rubbers. As further exemplification of suitable rubbery polymers there may be enumerated the homopolymers of conjugated dienes, copolymers of a conjugated diene and a copolymerizable comonomer selected from the group consisting of monovinylidene aromatic monomers, $C_{1-4}$ alkyl methacrylate, ethylenically unsaturated nitriles and mixtures thereof; copolymers of ethylene and propylene; interpolymers of ethylene, propylene and a diene; homopolymers of $C_{1-6}$ alkyl acrylates; and copolymers of $C_{1-6}$ alkyl acrylates with one or more copolymerizable comonomers. Preferred are the homopolymers of butadiene or copolymers (either block or random) of butadiene and styrene. (By the term "rubbery" is meant a polymer or copolymer having glass transistion temperatures prior to the grafting process of less than about 0° C.

According to the present invention the thermoplastic molding composition is prepared by the techniques of mass, solution, or mass-solution polymerization. According to such techniques, the rubbery polymer is dissolved in a mixture of monomers as previously disclosed. Optionally, an inert diluent such as an aromatic or aliphatic liquid, particularly toluene or ethylbenzene, may additionally be present. Polymerization is then initiated by any suitable technique such as by the use of a free radical initiator. Examples of suitable initiators include the well known peroxides. Molecular weight modifiers such as chain terminating agents and other known additives in mass or solution polymerization mixtures may of course additionally be present. Agitation or other suitable technique to obtain phase inversion of the polymerizing mixture is employed.

As an optional embodiment some quantity of the N-aryl maleimide monomer may be added after the polymerization has commenced and especially after the point of phase inversion. In one embodiment of the present invention an N-aryl maleimide monomer may be added continuously throughout the polymerization. In this manner improved low temperature impact properties have also been found to result. This process is more particularly disclosed and claimed in my copending application Ser. No. 142,163 filed Jan. 11, 1988.

Although the present invention may be practiced in a batch polymerization the invention is particularly suitable for preparation in a continuous process in order to achieve uniform sizing of the rubber particles. One such suitable process employs one or more well stirred reactors operating in series. Desirably, the polymerization is conducted in a train consisting of two and preferably three reactors. Phase inversion preferably occurs in the first reactor and the polymerizing mixture is discharged from the first reactor into the second reactor and subsequent reactors. In the remaining reactors polymerization is continued in the presence of agitation to prepare a uniformly sized rubber particle. The most desired rubber particle size (volume average) according to the present invention is from $0.5\mu$ to $10\mu$. After completing the polymerization in the second reactor or optionally additional reactors, the reaction mixture may be devolatilized to remove unreacted monomers and the resulting product recovered according to known techniques.

A further beneficial result may be obtained by preparing grafted rubber particles of two different sizes. This embodiment may be realized by adding to the reactor train a second monomer charge containing dissolved rubber at a point after phase inversion in the first reactor. Preferably additional monomer/rubber solution is added to the second reactor of a three reactor sequence. Alternatively two initial reactors may be operated under differing conditions of temperature, monomer ratio, initiator level, stirring rates, etc. so as to prepare grafted rubbers of differing particle size, structure and/or graft level and the two efluents combined in subsequent reactors of the polymerization series to prepare the resulting grafted and occluded rubber product.

However, in as much as low gloss properties are adversely affected by combining excessive amounts of extremely small rubber particles it is highly desirable that at least 75% and preferably at least 90% of the rubber particles have a volume average particle size from $0.8\mu$ to $6.0\mu$.

Additional amounts of rubber may be incorporated into the thermoplastic molding composition by blending or other suitable techniques, however, care should be exercised so that the desired low gloss surface aesthetics are not compromised. A particularly suitable rubber comprises a grafted rubbery polymer prepared by emulsion polymerization containing a grafted phase that is compatible with the compositions of the present invention. Suitable graft phases preferably include polymers of a monovinylidene aromatic monomer, an ethylenically unsaturated nitrile and optionally an N-aryl maleimide. A particularly preferred graft phase comprises a styrene/acrylonitrile copolymer. Suitably such grafted rubbery polymers are prepared by emulsion polymerizing the graft polymers in the presence of a latex of a butadiene based rubber, collecting and dewatering of the resulting latex and extruding the resulting latex to produce a rubber crumb product.

The incorporation of from 5 to 35% of the total composition weight of a grafted rubber as above described allows the achievement of relatively high impact resistance without substantial loss of surface aesthetics especially low surface gloss. Desirably, the use of a blended rubber component allows the operator to utilize lower amounts of rubber in the mass polymerization process and consequently operate utilizing less viscous and infractable polymerization mixtures. More highly viscous polymerization mixtures are undesired due to the necessity of resorting to extra strength agitator materials and the expenditure of greater amounts of energy in operating the agitator mechanism.

The various monomers and the rubbery polymer and optional additional grafted rubber are desirably combined so as to obtain a resulting product having a rubber content from about 2% to about 40% preferably from about 5% to about 25%, based on total composition weight. In addition, the ethylenically unsaturated nitrile and N-arylmaleimide are desirably maintained in amounts from about 5% to about 40% preferably from about 7% to about 30%, also based on weight, with any remainder comprising one or more additional copolymerizable comonomers.

Additional ingredients such as pigments, mold release agents, antioxidants, ignition supressants, reinforcing aids, fillers, blowing agents, extenders, other thermoplastic resins, etc. may be added if desired.

The surface gloss (60° Gardner gloss) of objects prepared by injection molding utilizing the thermoplastic molding composition of the present invention may be varied over a wide range from 4 to 95 by the use of differing melt and mold temperatures and textured mold surfaces. Most desirably under standard molding conditions using a polished mold surface a molded object having 60° Gardner gloss of less than 70 and preferably less than 65 may readily be prepared. Such objects do not require paint or other surface coating to cover molding imperfections.

Having described the invention, the following examples are provided as further illustrative and are not to be construed as limiting. Unless stated otherwise all percentages and parts are based on weight.

EXAMPLE 1

A continuous solution polymerization process is conducted utilizing three well stirred reactors of 25 L volume connected in series. Separate feed streams for monomer addition are provided for the first and second reactors. The feed to the initial reactor is prepared by dissolving a polybutadiene rubber (H×640A, available from Firestone Tire and Rubber Co.) in styrene (ST) and ethylbenzene. The appropriate amount of acrylonitrile monomer (AN) containing dissolved therein N-phenyl maleimide is added along with an antioxidant (Irganox 1076 available from Ceiba-Geigy Corp.) and peroxide initiator. The reaction mixture is charged at a rate of 8.7 kg/hr. to the first reactor which is maintained at an average reaction temperature of 100° C. Phase inversion occurs within the first reactor and the effluent is charged to the second reactor in the series. A molecular weight control agent (n-dodecyl mercaptan) and additional ethylbenzene solvent are also added. The temperature in the second reactor is maintained at about 115° C. The product from the second reactor is further charged to the third reactor maintained at a temperature of about 140° C. The final product was devolatilized to remove monomers and solvent and was pelletized. A polymer analysis is disclosed in Table I. The rubber volume average particle size was 5.0μ.

TABLE I

| (polymer analysis % by weight) | | | |
|---|---|---|---|
| Styrene | Acrylonitrile | n-phenyl maleimide | Rubber |
| 60.9 | 18.5 | 11.3 | 9.3 |

The rubber containing polymer product was combined with 20% by weight of a dry rubber crumb. The rubber crumb was prepared by the emulsion polymerization of styrene and acrylonitrile (styrene/acrylonitrile 73/37 by weight) in the presence of a preformed butadiene latex (a 1,000 Angstrom number average particle size) to give 1500 Angstrom number average particles. The latex was coagulated, recovered, dried and extruded to give the resulting dry rubber crumb. The resulting mixture was melt blended by passing through an extruder and pelletized.

Injection molded parts were prepared using a Battenfeld injection molding machine and an "A" pillar, polished surface (tool finish) mold. Polymer melt temperature was 430° F. (221° C.), mold temperature was 80° F. (27° C.) Test specimens were cut from the resulting molded parts and tested according to ASTM conditions. Results are contained in Table II.

TABLE II

| (Physical Properties) | | |
|---|---|---|
| Notched Izod[1] | DTUL[2] | 60° Gardner Gloss |
| 2.5 | 195 | 32 |

[1]Izod impact strength ft-lb./in notch
[2]Distortion Temperature Under Load (264 lbs/in$^2$, ⅛" (3mm) thick sample, unannealed) °C.

The molded part had both high heat resistance and good surface properties especially low gloss and would not require painting.

What is claimed is:

1. A thermoplastic molding composition which is capable of providing injection molded objects having 60° Gardner gloss values of less than 70 and which comprises:

A) a mass or solution polymerized graft copolymer composition comprising:
   1) a graft copolymer comprising in polymerized form an ethylenically unsaturated nitrile monomer, an N-aryl maleimide and at least one copolymerizable monomer selected from the group consisting of monovinylidene aromatic monomers, $C_{1-4}$ alkyl methacrylates, and mixtures thereof grated to a rubbery substrate polymer; and
   2) a matrix polymer comprising in polymerized form an ethylenically unsaturated nitrile monomer, an N-aryl maleimide and at least one copolymerizable monomer selected from the group consisting of monovinylidene aromatic monomers, $C_{1-4}$ alkyl methacrylate, and mixtures thereof, the content of said N-aryl maleimide in the graft copolymer and the matrix polymer being from 7 to 30 weight percent based on the total weight of the mass or solution polymerized graft copolymer composition; and B) from 5 to 35% on a total molding composition weight basis of an emulsion polymerized grated rubbery polymer having a polymer of a monovinylidene aromatic monomer, an ethylenically unsaturated nitrile and, optionally, an N-aryl maleimide grated to a rubbery polymer substrate.

2. A thermoplastic molding composition according to claim 1 wherein the N-aryl maleimide component of the mass or solution polymerized graft copolymer is N-phenyl maleimide.

3. A thermoplastic molding composition according to claim 1 wherein the unsaturated nitrile of the mass or solution polymerized graft copolymer and the emulsion polymerized graft copolymer is acrylonitrile and the copolymerizable monomer of the mass or solution polymerized graft copolymer and the emulsion polymerized graft copolymer is styrene.

4. A thermoplastic molding composition according to claim 1 wherein the rubbery substrate of the mass or solution polymerized graft copolymer is a homopolymer of a conjugated diene, a copolymer of a conjugated diene and an copolymerizable comonomer selected from the group consisting of monovinylidene aromatic monomers, $C_{1-4}$ alkyl methacrylates, ethylenically unsaturated nitriles and mixtures thereof; copolymers of ethylene and propylene; interpolymers of ethylene, propylene and a diene; homopolymers of $C_{1-6}$ alkyl acrylates; and copolymers of $C_{1-6}$ alkyl acrylates with one or more copolymerizable comonomers.

5. The thermoplastic molding composition of claim 1 wherein the mass or solution polymerized graft copolymer has a volume average rubber particle size of from 0.5 to 10 microns.

6. The thermoplastic molding composition of claim 5 wherein at least 75% of the rubber particles of the mass or solution polymerized graft copolymer have a volume average particle size of from 0.8 to 6 microns.

7. A molded object having a 60° Gardner Gloss of less than 70 having been molded from a thermoplastic molding composition comprising:
   A) a mass or solution polymerized graft copolymer composition comprising:
      1) a graft interpolymer comprising in polymerized form an ethylenically unsaturated nitrile monomer, an N-aryl maleimide and at least one copolymerizable monomer selected from the group consisting of monovinylidene aromatic monomers, $C_{1-4}$ alkyl methacrylates, and mixtures thereof grafted to a rubbery substrate polymer; and
      2) a matrix polymer comprising in polymerized form an ethylenically unsaturated nitrile monomer, an N-aryl maleimide and at least one copolymerizable monomer selected from the group consisting of monovinylidene aromatic monomers, $C_{1-4}$ alkyl methacrylate, and mixtures thereof, the content of said N-aryl maleimide in the graft interpolymer and the matrix polymer being from 7 to 30 weight percent based on the total weight of the mass or solution polymerized graft copolymer composition; and
   B) from 5 to 35% on a total molding composition weight basis of an emulsion polymerized grafted rubbery polymer having a polymer of a monovinylidene aromatic monomer, an ethylenically unsaturated nitrile and, optionally, an N-aryl maleimide grated to a rubbery polymer substrate.

8. A molded object according to claim 7 wherein the N-aryl maleimide of the mass or solution polymerized graft copolymer is N-phenyl maleimide.

9. A molded object according to claim 7 wherein the rubbery polymer substrate of the emulsion polymerized graft copolymer is a butadiene-based rubber.

10. A molded object according to claim 9 wherein the rubbery substrate of the mass or solution polymerized graft copolymer is a homopolymer of a conjugated diene, a copolymer of a conjugated diene and a copolymerizable comonomer selected from the group consisting of monovinylidene aromatic monomers, $C_{1-4}$ alkyl methacrylate, ethylenically unsaturated nitriles and mixtures thereof; a copolymer of ethylene and propylene; and interpolymer of ethylene, propylene and a diene; homopolymers of $C_{1-6}$ alkyl acrylates; and copolymers of $C_{1-6}$ alkyl acrylates with one or more copolymerizable comonomers.

11. The molded object of claim 7 wherein the 60° Gardner gloss value thereof is less than 65.

12. A process for preparing a thermoplastic molding composition suitable for preparing injection molded objects having a 60° Gardner Gloss value of less than 70 comprising:
   A) preparing a mass or solution polymerized graft copolymer by:
      1) dissolving a rubbery polymer in a mixture of monomers comprising an ethylenically unsaturated nitrile, a copolymerizable monovinylidene monomer and from 7 to 30 weight percent, based on the total weight of said mass or solution polymerized graft copolymer, of an N-aryl maleimide;
      2) initiating free radical polymerization of the rubber containing solution and continuing the polymerization thereof under mass or solution polymerization conditions so as to obtain a phase inversion of the solution;
      3) continuing polymerization of the rubber containing solution; and
      4) recovering the resulting mass or solution polymerized polymeric product; and
   B) combining said mass or solution polymerized graft copolymer with from 5 to 35% on a total molding composition weight basis of an emulsion polymerized grafted rubbery polymer having a polymer of a monovinylidene aromatic monomer, an ethylenically unsaturated nitrile and, optionally, an N-aryl maleimide grafted to a rubbery polymer substrate.

13. A process according to claim 12 wherein the comonomers of the mass or solution polymerized graft copolymer comprise acrylonitrile, styrene, and N-phenyl maleimide.

14. A process according to claim 13 wherein the graft phase of the emulsion polymerized graft copolymer is a styrene/acrylonitrile copolymer.

15. A process according to claim 12 wherein the rubbery substrate of the mass or solution polymerized graft copolymer is a homopolymer of a conjugated diene, a copolymer of a conjugated diene and a copolymerizable comonomer selected from the group consisting of monovinylidene aromatic monomers, $C_{1-4}$ alkyl methacrylates, ethylenically unsaturated nitriles and mixtures thereof; copolymers of ethylene and propylene; interpolymers of ethylene, propylene and a diene; homopolymers of $C_{1-6}$ alkyl acrylates; and copolymers of $C_{1-6}$ alkyl acrylates with one or more copolymerizable comonomers.

16. A process according to claim 15 wherein the rubbery polymer substrate of the emulsion polymerized graft copolymer is a butadiene-based rubber.

* * * * *